US006470548B2

(12) United States Patent
Kao

(10) Patent No.: US 6,470,548 B2
(45) Date of Patent: Oct. 29, 2002

(54) TOOL FOR MOUNTING A CLIP TO A SOCKET

(75) Inventor: Tien Lu Kao, Cypress, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/749,043

(22) Filed: Dec. 27, 2000

(65) Prior Publication Data

US 2002/0078544 A1 Jun. 27, 2002

(51) Int. Cl.[7] .................................................. B23P 19/04
(52) U.S. Cl. ......................... 29/243.56; 29/278; 29/267
(58) Field of Search .............................. 29/243.56, 278, 29/270, 426.5, 426.6, 229, 450, 451, 267, 268, 239, 758; 254/131

(56) References Cited

U.S. PATENT DOCUMENTS 3,713,200 A * 1/1973 Burns .......................... 29/267
3,736,643 A * 6/1973 Pepe ........................... 26/267
4,768,271 A * 9/1988 Jacob et al. .................. 29/267

* cited by examiner

*Primary Examiner*—Robert C. Watson
(74) *Attorney, Agent, or Firm*—Wei Te Chung

(57) ABSTRACT

A tool (10) for mounting a heat sink clip (80) to a CPU socket (100) includes a body (12) and a T-shaped handle (13). The body has a top surface (18) and a bottom surface (20). A protrusion (22) and a projection (26) are respectively formed downwardly from opposite sides of the bottom surface. A tongue (24) is formed at a free end of the projection. A cutout (32) is defined in the body between the bottom surface and the tongue, for receiving a pressing plate (92) of the clip. The handle extends upwardly from the top surface of the body. When the tool is downwardly pressed, the protrusion and projection downwardly press the clip to cause arms (84, 94) of the clip to downwardly and outwardly move and thereby engage with catches (102) of the socket.

11 Claims, 3 Drawing Sheets

TOOL FOR MOUNTING A CLIP TO A SOCKET

BACKGROUND OF THE INVENTION

1. Field of the Invention

The present invention relates to a tool for a clip, and particularly to a tool for mounting a heat sink clip to a central processing unit socket.

2. Related Art

A heat sink placed in contact with a central processing unit (CPU) transfers heat away from the CPU through conduction. Oftentimes, a heat sink is secured to a CPU by a clip which is attached to a CPU socket.

A conventional clip securing a heat sink to a CPU comprises a pressing portion and a pair of first and second arms respectively depending from opposite ends of the pressing portion. Each arm defines an opening, for engagement of the arm with a corresponding catch of the socket. In assembly, the first arm is engaged with one catch. Then the second arm is stretched outwardly and moved downwardly by hand to engage with another catch. Engaging the second arm with the corresponding catch is unduly complicated and laborious.

Thus another kind of clip has been developed. The clip comprises two members. Each member has an arm, and each arm defines an opening. In assembly, a first arm is engaged with a first catch of a socket at the opening of the first arm. A handle of a second member is then pushed outwardly and downwardly, thereby causing a second arm to engage with a second catch of the socket at the opening of the second arm. The handle of the clip facilitates engagement of the second arm with the second catch. However, engaging the second arm is unduly laborious. Furthermore, contemporary heat sinks are being made larger and larger, and so the clips required to secure them need to be attached tighter and tighter. It is therefore often very difficult to secure a clip to a CPU socket merely by hand.

A tool for readily mounting a heat sink clip to a CPU socket which overcomes the above problems encountered in the prior art is strongly desired.

SUMMARY OF THE INVENTION

Accordingly, an object of the present invention is to provide a tool for readily mounting a heat sink clip to a CPU socket.

To achieve the above-mentioned object, a tool for mounting a heat sink clip to a CPU socket in accordance with the present invention comprises a body and a T-shaped handle. The body has a top surface and a bottom surface. A protrusion and a projection are formed downwardly from opposite sides of the bottom surface respectively. A tongue is formed at a free end of the projection. A cutout is defined between the bottom surface and the tongue, for receiving a pressing plate of the clip. The handle includes a shaft extending upwardly from the top surface, and a beam extending horizontally in opposite directions from a top end of the shaft and parallel to the top surface. When the tool is downwardly pressed, the protrusion and the projection downwardly press the clip to cause arms thereof to downwardly and outwardly move and thereby engage with catches of the socket.

Other objects, advantages and novel features of the present invention will be drawn from the following detailed description of a preferred embodiment of the present invention with reference to the attached drawings, in which:

DESCRIPTION OF THE PREFERRED EMBODIMENT

Figure 1:
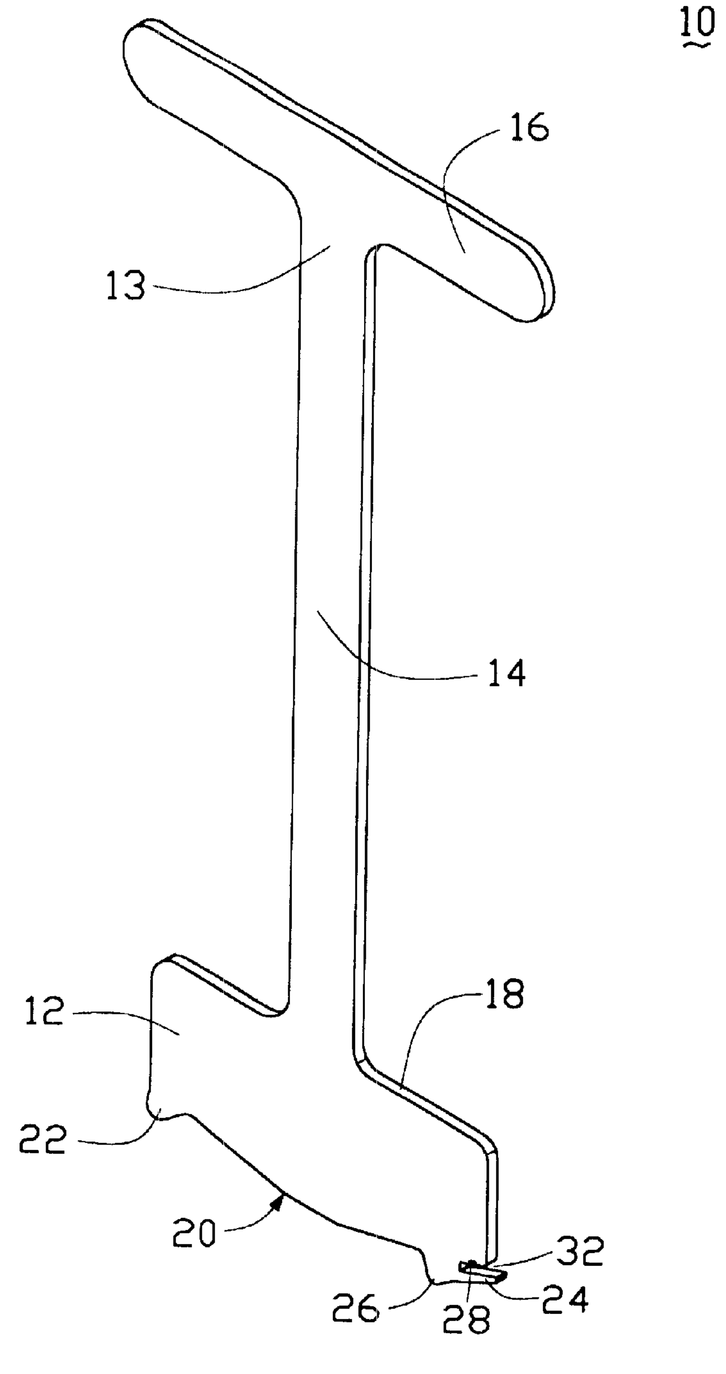
FIG. 1 is a perspective view of a tool in accordance with the present invention.

Referring to FIG. 1, a tool 10 in accordance with the present invention comprises a body 12 and a T-shaped handle 13.

The body 12 is generally rectangular in shape. The body 12 has a top surface 18 and a curved bottom surface 20. A protrusion 22 is formed downwardly from one side of the bottom surface 20. A projection 26 is formed downwardly from an opposite side of the bottom surface 20. A free end of the projection 26 forms a tongue 24. A cutout 32 is thereby defined between the bottom surface 20 and the tongue 24. The bottom surface 20 defines a groove 28 therein, in communication with the cutout 32.

The T-shaped handle 13 comprises a vertical shaft 14 and a horizontal beam 16. The shaft 14 extends upwardly from a center portion of the top surface 18 of the body 12. The beam 16 extends horizontally in opposite directions from a top end of the shaft 14, parallel to the top surface 18.

Figure 2:
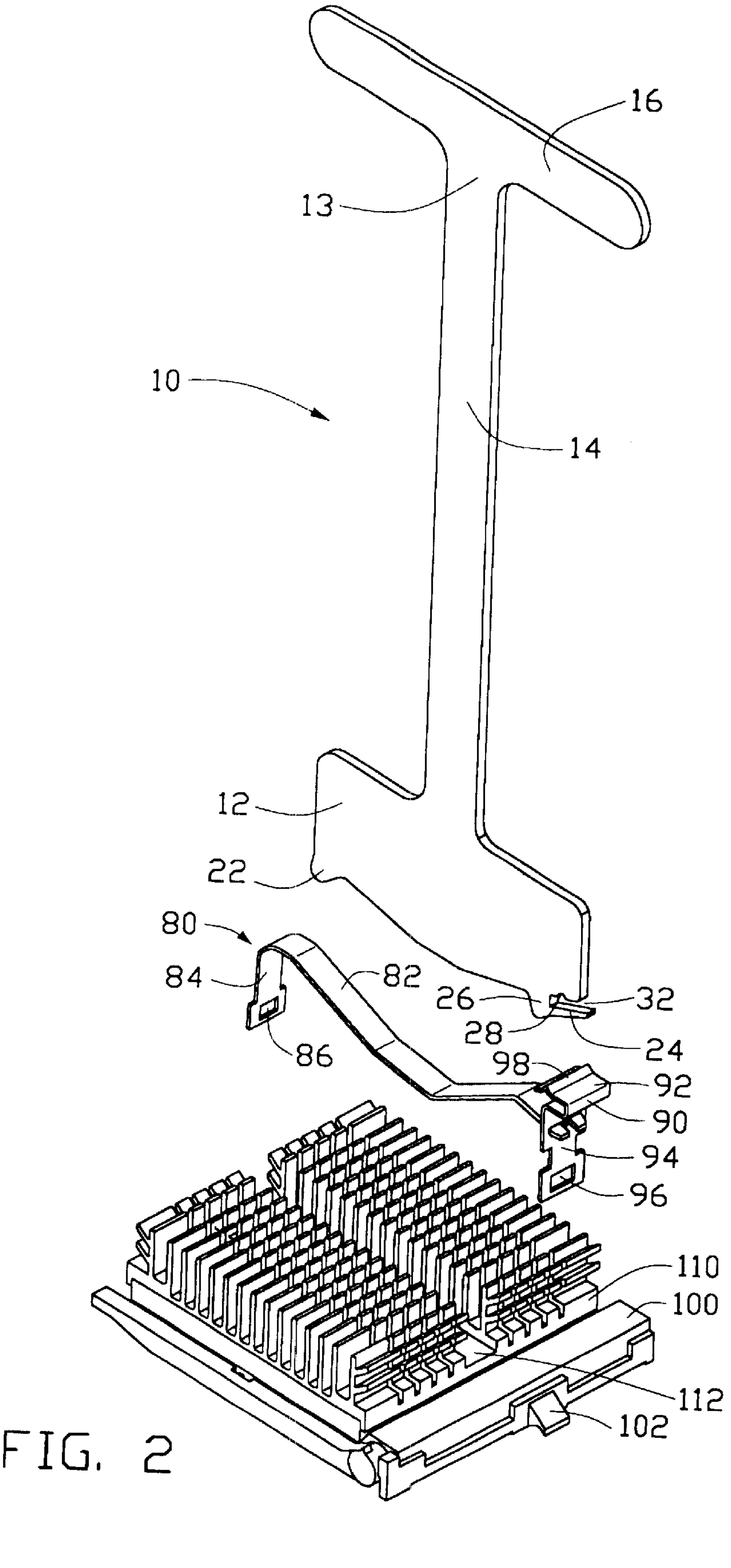
FIG. 2 is an exploded view of a heat sink mounted on a CPU socket, a clip, and the tool of FIG. 1.

FIG. 2 shows the tool 10 ready for mounting a clip 80 to a CPU socket 100 on which a heat sink 110 is mounted. The clip 80 comprises a first member 82, and a second member 90 attached at one end of the first member 82. The first member 82 has a first arm 84 with a first opening 86 for engaging with a catch 102 (not visible) of the socket 100. The second member 90 comprises a pressing plate 92 and a second arm 94. The pressing plate 92 has a ridge 98 corresponding to the groove 28 of the handle 10. The second arm 94 defines a second opening 96 corresponding to another catch 102 of the socket 100. The heat sink 110 has a channel 112 defined therethrough.

Figure 3:
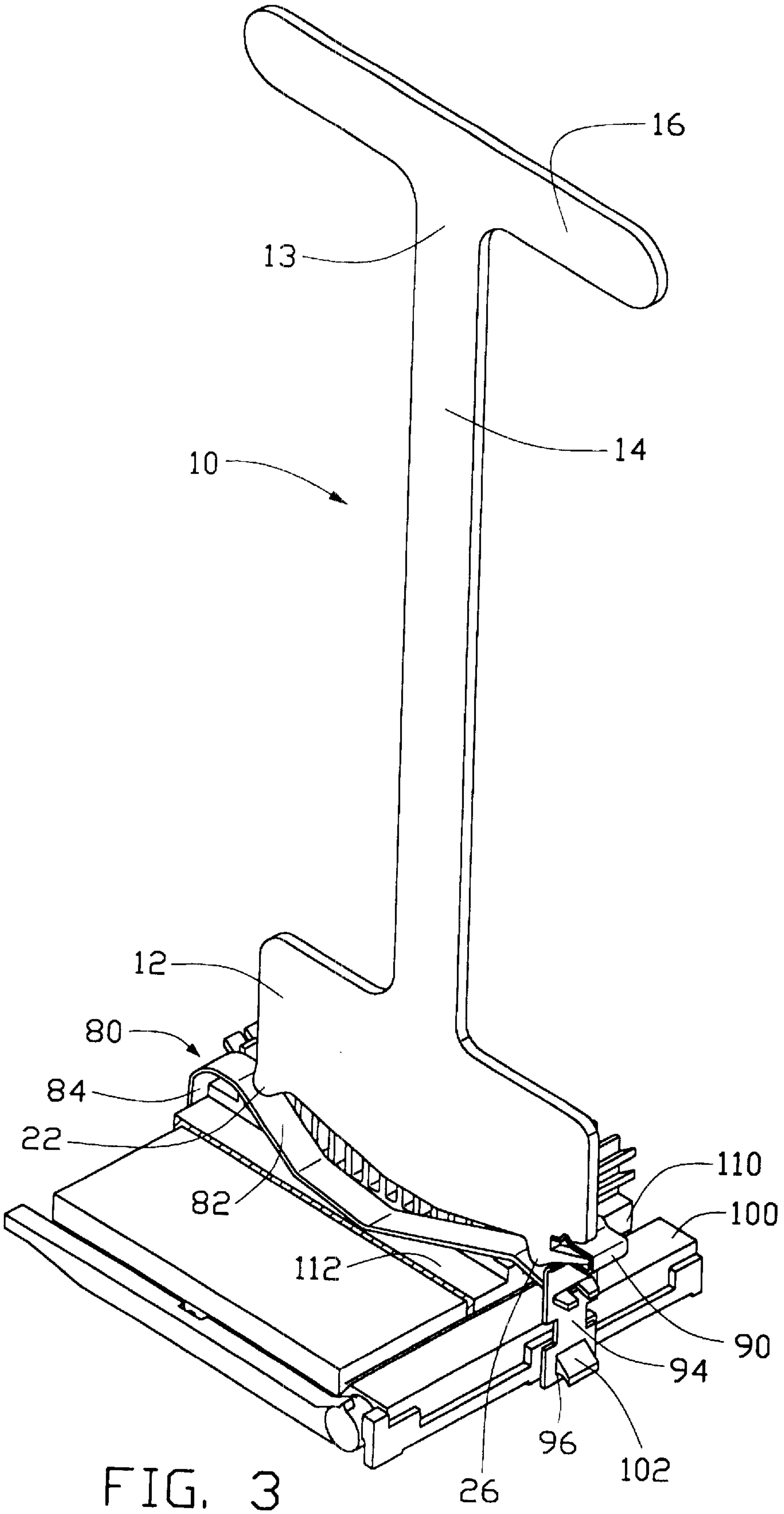
FIG. 3 is a partly cut-away view of the heat sink mounted on the CPU socket, with the clip fully mounted to the socket by the tool.

Referring also to FIG. 3, in use of the tool 10, the clip 80 is placed on the heat sink 110 in the channel 112. The tool 10 is then placed on the clip 80. The protrusion 22 of the tool 10 abuts the first member 82 of the clip 80 near the first arm 84 thereof. The projection 26 of the tool 10 abuts the first member 82 near the second arm 94. The pressing plate 92 of the second arm 94 is received in the cutout 32 of the tool 10, for facilitating control of movement of the second arm 94. The ridge 98 of the clip 80 abuts the tool 10 at the groove 28, and the tongue 24 of the tool abuts the pressing portion 92 of the clip 80. Using the handle 13, the tool 10 is pressed downwardly. The first and second arms 84, 94 are thus moved downwardly and outwardly, and the first member 82 elastically deforms accordingly. Once the first and second openings 86, 96 of the clip 80 have slid over the corresponding catches 102 of the socket 100, pressing of the tool 10 is stopped. The first member 82 elastically deforms part of the way back toward its original shape, and thereby causes the first and second arms 84, 94 to engage with the corresponding catches 102. Thus the clip 80 is readily engaged with the socket 100, thereby securing the heat sink 110 on the socket 100.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A tool adapted for mounting a clip to a socket, the clip having a first arm and a second arm with a pressing plate, the tool comprising:

a body having a first press portion adapted for downwardly pressing the clip to engage the first arm of the clip with the socket, a cutout for receiving the pressing plate of the clip therein and thereby facilitating control of movement of the second arm of the clip, and a second press portion adapted for downwardly pressing the clip to engage the second arm of the clip with the socket; and a T-shaped handle extending from the body.

2. The tool as claimed in claim 1, wherein the first press portion comprises a protrusion opposite to the handle.

3. The tool as claimed in claim 2, wherein the second press portion comprising a projection opposite to the handle and the protrusion.

4. The tool as claimed in claim 3, wherein a tongue is formed at the projection of the body, and wherein the cutout is defined between the tongue and the body.

5. The tool as claimed in claim 3, wherein the body defines a groove therein in communication with the cutout, for receiving a ridge of the pressing plate of the clip.

6. A tool adapted for mounting a clip to a socket, the clip having a first arm and a second arm with a pressing plate, the tool comprising:

a body having a first press portion adapted for downwardly pressing the clip to engage the first arm of the clip with the socket, a cutout for receiving the pressing plate of the clip therein and thereby facilitating control of movement of the second arm of the clip, and a second press portion adapted for downwardly pressing the clip to engage the second arm of the clip with the socket; and a handle extending from the body; wherein the first press portion comprises a protrusion opposite to the handle, the second press portion comprises a projection opposite to the handle and the protrusion, and the body defines a groove therein in communication with the cutout, for receiving a ridge of the pressing plate of the clip.

7. The tool as claimed in claim 6, wherein the handle of the tool is T-shaped.

8. The tool as claimed in claim 6, wherein a tongue is formed at the projection of the body, and wherein the cutout is defined between the tongue and the body.

9. A tool mounting a clip to a socket, the socket having a pair of catches on opposite sides thereof, the clip comprising a first member and a second member attached to one end of the first member, the first member comprising a first arm defining a first opening for engagement with one of the catches, the second member comprising a pressing plate and a second arm defining a second opening for engagement with the other of the catches, the tool comprising:

a body comprising a protrusion abutting the first member near the first arm, a projection abutting the first member near the second arm, a cutout receiving the pressing plate, and a groove in communication with the cutout and receiving a ridge of the pressing plate of the clip; and a handle extending upwardly from the body; wherein when the body is pressed downwardly the first and second arms are moved downwardly and outwardly to thereby enable the catches to engage in the first and second openings of the clip.

10. The tool as claimed in claim 9, wherein a tongue is formed at the projection of the body, and wherein the cutout is defined between the tongue and the body.

11. In combination, a socket with a chip thereon, a heat sink seated upon said chip, a clip comprising a first member with an associated second member pivotally attached to the first member, the first member including a first opening to be engaged with a first catch on the socket, the second member including a second opening to be engaged with a second catch on the socket, said second member including a pressing plate located above the first member, and a tool including a body having around a bottom portion thereof at least one pressing portion pressing the clip downwardly to engage the second opening of the second member with the second catch, and a notch above said pressing portion to receive said pressing plate of the second member therein for preventing improper movement of said second member during assembling the clip to the socket.

* * * * *